Figure 1:
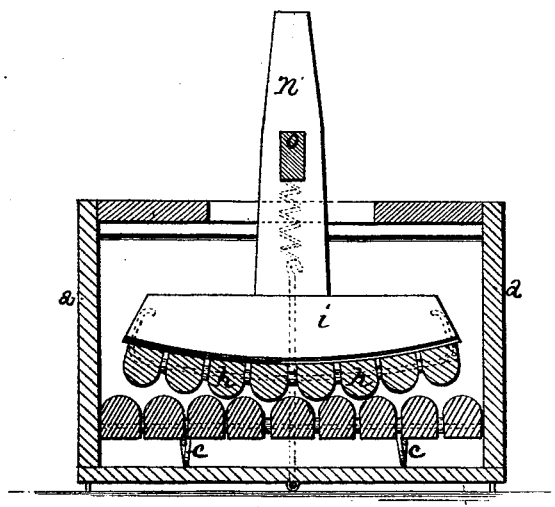
Figure 2:
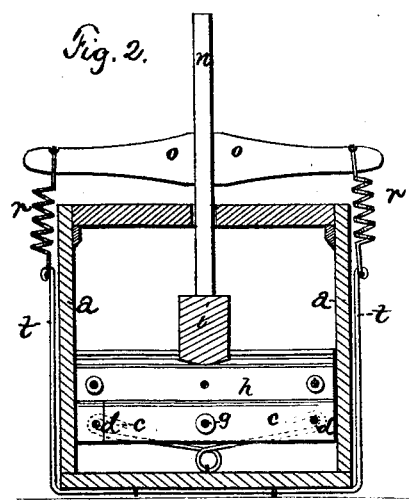
Figure 3:
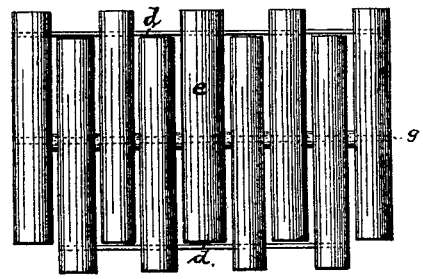

W. J. BIDDLE.
WASHING-MACHINE.

No. 183,887. Patented Oct. 31, 1876.

WITNESSES.
J. W. Garner
F. M. Burnham.

INVENTOR:
William J. Biddle.
Per F. A. Lehmann
Atty.

UNITED STATES PATENT OFFICE.

WILLIAM J. BIDDLE, OF NEW MADISON, OHIO.

IMPROVEMENT IN WASHING-MACHINES.

Specification forming part of Letters Patent No. 183,887, dated October 31, 1876; application filed October 6, 1876.

*To all whom it may concern:*

Be it known that I, WILLIAM J. BIDDLE, of New Madison, in the county of Darke and State of Ohio, have invented certain new and useful Improvements in Washing-Machines; and I do hereby declare the following to be a full, clear, and exact description of the invention, such as will enable others skilled in the art to which it pertains to make and use it, reference being had to the accompanying drawings, which form part of this specification.

My invention relates to an improvement in washing-machines; and it consists in the peculiar construction of the bottom of the box, in combination with the devices by means of which the washer is made to operate therewith, as will be more fully described hereinafter.

The accompanying drawings represent my invention.

$a$ represents a box, of suitable shape and size, to the bottom of which are secured the two double arms $c$. These arms consist of iron rods, which extend nearly across the box. From the center the arms extend slightly upward, as shown, toward the sides of the box, and then have their ends bent sharply over, so as to hold the straight rods $d$, that extend along parallel with the sides of the box. By pivoting the arms at their centers and bending them upward, they can be rocked from side to side. The bottom bars $e$, which form the bottom of the box for the clothes, are pivoted upon the bar or rod $g$, each bar $e$ being pivoted just past its center, and then alternately arranged so that their longest parts extend in opposite directions. Each one of the longest ends has one of the rods $d$ passed through it, and thus the bottom bars $e$ are fastened together by the three rods $d\ g$, and are held in position by the double arms $c$. As these bars $e$ can be made to assume the form of the letter X, they can be readily taken from and replaced in the box when desired.

The washer consists of the cross-bars $h$, which are secured on a curve to the beam $i$, from which beam rises the standard $n$. Projecting through this standard is the cross-arm $o$, over the ends of which catch the coiled springs $r$, for holding the washer down on the clothes. These springs are fastened to the rod $t$, which is bent in the shape of a cross-section of the box, and pivoted to its under side, so that it can be turned down out of the way. The washer, being curved on its under side, is rocked back and forth over the clothes, instead of being moved over them, so as to give them a rubbing motion.

Having thus described my invention, I claim—

1. The arms $c$, bars $e$, and rods $d\ g$, combined and arranged substantially as shown.

2. The combination of the bars $h$, curved beam $i$, standard $n$, cross-arm $o$, springs $r$, and rod $t$, pivoted to the box $a$, substantially as specified.

In testimony that I claim the foregoing I have hereunto set my hand this 19th day of September, 1876.

WILLIAM J. BIDDLE.

Witnesses:
J. G. SNODGRASS,
WM. J. RYHN.